United States Patent
Song et al.

(10) Patent No.: US 11,520,068 B2
(45) Date of Patent: Dec. 6, 2022

(54) DETECTION COIL STRUCTURE BASED ON INTERLAYER COUPLING AND METAL OBJECT DETECTION SYSTEM

(71) Applicant: Harbin Institute of Technology, Harbin (CN)

(72) Inventors: Kai Song, Harbin (CN); Ying Sun, Harbin (CN); Tian Zhou, Harbin (CN); Guo Wei, Harbin (CN); Chunbo Zhu, Harbin (CN)

(73) Assignee: HARBIN INSTITUTE OF TECHNOLOGY, Harbin (CN)

( * ) Notice: Subject to any disclaimer, the term of this patent is extended or adjusted under 35 U.S.C. 154(b) by 0 days.

(21) Appl. No.: 17/238,447

(22) Filed: Apr. 23, 2021

(65) Prior Publication Data

US 2022/0334287 A1    Oct. 20, 2022

(30) Foreign Application Priority Data

Apr. 15, 2021  (CN) .......................... 202110408113.5

(51) Int. Cl.
 *G01V 3/10*  (2006.01)
 *G01V 3/38*  (2006.01)

(52) U.S. Cl.
 CPC ................ *G01V 3/101* (2013.01); *G01V 3/38* (2013.01)

(58) Field of Classification Search
 CPC .................................. G01V 3/101; G01V 3/38
 See application file for complete search history.

(56) References Cited

U.S. PATENT DOCUMENTS

2011/0031970 A1*  2/2011  Ninomiya .......... G01R 33/3415
                                                          324/309

FOREIGN PATENT DOCUMENTS

CN    111682653 A   *  9/2020
CN    112311108 A   *  2/2021
(Continued)

OTHER PUBLICATIONS

Machine translation of JP6799820B2 (Year: 2013).*
(Continued)

*Primary Examiner* — Douglas X Rodriguez
*Assistant Examiner* — Sangkyung Lee
(74) *Attorney, Agent, or Firm* — IPro, PLLC; Na Xu

(57) ABSTRACT

The disclosure discloses a detection coil structure based on interlayer coupling and a metal object detection system. The detection coil structure includes: a top sub-detection coil and a bottom sub-detection coil, wherein the top and bottom sub-detection coils are the same in structure and similar or same in size and are orthogonal to each other, and both the outer boundaries and geometric symmetry centers of the detection coils are completely coincident; the top sub-detection coil includes a first terminal, a second terminal, a third terminal and a fourth terminal, and the bottom sub-detection coil includes a fifth terminal, a sixth terminal, a seventh terminal and an eighth terminal; and the first terminal is connected to the second terminal, the seventh terminal is connected to the eighth terminal, and the third terminal and the fourth terminal are respectively connected to the fifth terminal and the sixth terminal. When there is no metal object near the coil, the top and bottom sub-detection coils are completely decoupled, and the mutual inductance is zero. When there is a metal object near the coil, the detection coil structure can significantly amplify the impedance variation of the metal object to the entire detection coil to improve the detection effect by means of the mutual inductance coupling effect between the top and bottom sub-detection coils, and at the same time, a staggered arrangement structure can further eliminate non-detection blind zones.

7 Claims, 11 Drawing Sheets

(56) References Cited

FOREIGN PATENT DOCUMENTS

| | | | | |
|---|---|---|---|---|
| FR | 3014285 | A1 * | 6/2015 | ......... B60R 16/0238 |
| JP | 6799820 | B2 * | 12/2020 | ............. H02M 1/08 |
| WO | WO-2019242322 | A1 * | 12/2019 | ............. G01V 3/081 |

OTHER PUBLICATIONS

Machine translation of WO2019242322A1 (Year: 2019).*
Machine translation of FR3014285A1 (Year: 2015).*
Machine translation of CN111682653A (Year: 2020).*
Machine translation of CN112311108A (Year: 2021).*

* cited by examiner

Self-inductance model of top sub-detection coil

Self-inductance model of bottom sub-detection coil (a) (b)

DETECTION COIL STRUCTURE BASED ON INTERLAYER COUPLING AND METAL OBJECT DETECTION SYSTEM

TECHNICAL FIELD

The disclosure relates to the technical fields of metal detection and wireless power transmission, and particularly relates to a detection coil structure based on interlayer coupling for improving detection sensitivity, and a metal object detection system.

BACKGROUND

The technical principle of wireless power transmission is: a transmitting coil is excited by an alternating current to generate an alternating magnetic field, and power is coupled to a receiving coil through the alternating magnetic field and provides power for a load, thereby realizing wireless transmission of the power. Compared with the traditional mode of realizing power transmission through a metal wire, the wireless power transmission technology can avoid problems such as electric sparks and contact wear and aging of plugs, and can be applied to non-contact power transmission occasions. In the process of gradual application of this technology, safety problems (such as object detection) also need to be solved.

Due to the non-contact characteristic of this technology, objects may be introduced between a transmitting terminal and a receiving terminal. Conductive objects will be heated due to the eddy current effect, which may cause potential safety hazards of burning objects, scalding the human body, destroying the wireless charging system, etc. Living objects (such as human bodies, pets, and birds) will feel uncomfortable or even diseased due to exposure to a strong alternating magnetic field of the wireless charging system. Other objects (such as plastic) will not be affected by the strong alternating magnetic field or do damage to the wireless charging system. For the conductive objects and living objects entering into the wireless power transmission system, it is necessary to accurately detect and identify the type of the objects and respectively make a response at the same time respectively.

In the field of metal detection, the metal detectors have poor detection effect on small-size metal objects (such as clips and staples) or remote metal objects, or even cannot detect the small-size metal objects or the remote metal objects. In some cases, the metal objects need to align or approach to the metal detectors closely (such as safety inspection metal detectors in airports/stations) to guarantee the detection effect. The problem is essentially that the metal object has less influence on the impedance of the detection coil. Therefore, under the condition that the metal object has less influence on the impedance of the detection coil, the problem of how to accurately detect the metal object and improve the detection sensitivity needs to be solved.

In view of the above problems, the current technology in the field has successively proposed the following technical solutions for design of detection coils:

In 2012, Simon Verghese, et al of Witricity proposed a method for detecting metal objects based on a series-opposing detection coil unit. By reasonably designing the area of each sub-ring, the magnetic flux of the series-opposing detection coil is counteracted, and the approach of metal objects will break the magnetic flux balance between the sub-rings. That is, the presence of metal objects can be detected by detecting the induced voltage of the series-opposing detection coil unit. Furthermore, the method can be designed into different modes, so that transmitting terminal coils of different structures can be densely laid and can be arranged in multiple layers to eliminate detection dead zones.

In 2013, Bombardier designed a honeycomb detection coil array for dynamic wireless power supply guide rails, which can detect the presence or absence of metal objects by detecting whether the resonance frequency of an oscillator where each coil is located has changed, and detect living bodies through a microwave Doppler radar.

In 2014, Hanspeter Widmer, et al of Qualcomm proposed a method for detecting metal objects based on a multi-coil eddy current sensor array. The principle of this method is: a coil is used as an inductor in an LC oscillation circuit, and when a metal object enters a detection zone, the magnetic field generated by the eddy current inside the metal object reacts with the detection coil, which will change the impedance of the energized coil, thereby affecting the inherent resonance frequency of the LC oscillation circuit. The presence and position of the metal object can be detected by just comparing the frequency difference between the changed LC oscillation circuit frequency and the standard frequency.

In 2016, M. R. Sonapreetha, et al of the Korea Advanced Institute of Science and Technology (KAIST) proposed a detection coil structure capable of simultaneously detecting position of a metal object and the relative position of the receiver coil of wireless power transmission system. The principle of the detection coil structure is: by virtue of the alternating magnetic field generated by the transmitter coil of wireless power transmission system, the difference in induced voltage of a detection coil group is measured to reflect the difference in magnetic flux between two symmetrical detection coils caused by the approach of the metal object, and then, the induced voltage of the detection coil group and the difference thereof are measured, so that the presence or absence and the position of the metal object can be detected, and the relative position of the receiver coil of wireless power transmission system can also be detected. In experiments, a detection circuit and a display interface are designed, several 100 Korea Won coins are detected, and the positions of the coins can be accurately detected in the interface.

However, there are still some defects in related technologies. For example, there are various technologies used to realize wireless charging object detection, but they are independent of each other. When a detection coil method is used for detecting metal objects, there are non-detection blind zones or positions with poor detection results, which may cause potential safety hazards. Some technologies are too high in cost, which hinders system integration (such as a fiber refraction detection method and a fiber refractive index temperature detection method). Some technologies have slow response speed and retardance (such as a temperature detection method). Some technologies are greatly affected by environments and strong alternating magnetic fields and thus cannot judge the type of objects and may have misjudgments (such as machine vision detection, radar detection and platinum resistance temperature sensors).

Therefore, a new coil structure is urgently needed to solve the technical problem that the existing metal object detection coils are difficult to detect small-size metal objects such as coins and clips.

SUMMARY

The disclosure aims to solve one of the technical problems in the related art at least to a certain extent.

Therefore, one objective of the disclosure is to provide a detection coil structure based on interlayer coupling and a staggered arrangement mode thereof.

Another objective of the disclosure is to provide a metal object detection system with high sensitivity and no blind zone.

In order to achieve the above objectives, an embodiment according to one aspect of the disclosure provides a detection coil structure based on interlayer coupling, including a top sub-detection coil and a bottom sub-detection coil, wherein the top sub-detection coil and the bottom sub-detection coil are the same in structure and similar or same in size, the top sub-detection coil and the bottom sub-detection coil are orthogonal to each other, the outer boundaries of the two detection coils are completely coincident, and the geometric symmetry centers of the two detection coils are also completely coincident; the top sub-detection coil includes a first terminal, a second terminal, a third terminal and a fourth terminal, and the bottom sub-detection coil includes a fifth terminal, a sixth terminal, a seventh terminal and an eighth terminal; the first terminal is connected to the second terminal, the seventh terminal is connected to the eighth terminal, one of the two pairs of the first terminal and the second terminal as well as the seventh terminal and the eighth terminal can be connected to a detection circuit through a lead wire and a switch or relay that are used to switch different detection coils into the detection circuit; the other pair of terminals are connected; the third terminal and the fourth terminal are respectively connected to the fifth terminal and the sixth terminal; and the connection mode of the third terminal and the fourth terminal or the fifth terminal and the sixth terminal can be switched to change forward and reverse connection modes of the dotted terminals of the top and bottom sub-detection coils.

The staggered arrangement mode of the detection coil structure based on interlayer coupling according to the embodiment of the disclosure can synthesize the results of adjacent detection coils to significantly improve the detection effect in a case that a metal object is in a corner zone of a detection coil, thereby further eliminating non-detection blind zones. Furthermore, in application occasions of wireless power transmission, a detection coil group or a detection coil array may be laid on the surface of a transmitting coil to detect metal objects, such that the safety of a wireless power transmission system is ensured, and the magnetic flux and induced voltage generated by the transmitting coil during the power transmission of a wireless charging system can be significantly reduced due to the proposed detection coil structure, thereby increasing the signal-to-noise ratio of detection signals.

In addition, the detection coil structure based on interlayer coupling according to the above embodiment of the disclosure may also have the following additional technical features:

Optionally, in one embodiment of the disclosure, the structures of the top sub-detection coil and the bottom sub-detection coil are of any one of a square, a circle and a polygon.

Further, in one embodiment of the disclosure, the third terminal and the fourth terminal in the top sub-detection coil and the fifth terminal and the sixth terminal in the bottom sub-detection coil are connected in series through a plurality of switch devices or relays and lead wires, via holes or through holes in a circuit board, and the connection mode of the top sub-detection coil and the bottom sub-detection coil is switched through the switch devices or the relays, so that the positive or negative feature of mutual inductance between the top sub-detection coil and the bottom sub-detection coil is changed.

Further, in one embodiment of the disclosure, when the connection modes of the top sub-detection coil and the bottom sub-detection coil are different, if there is a metal object, different connection modes will cause the current positive or negative feature of mutual inductance between the top sub-detection coil and the bottom sub-detection coil to be different.

Further, in one embodiment of the disclosure, when there is no metal object near the detection coil, the net magnetic flux generated by the bottom sub-detection coil on the top sub-detection coil is zero, the net magnetic flux generated by the top sub-detection coil on the bottom sub-detection coil is zero, and ideally, the mutual inductance between the top sub-detection coil and the bottom sub-detection coil is zero, so that no mutual inductance coupling is generated between the top sub-detection coil and the bottom sub-detection coil. When there is a metal object near the detection coil, the net magnetic flux generated by the bottom sub-detection coil on the top sub-detection coil is not zero, the net magnetic flux generated by the top sub-detection coil on the bottom sub-detection coil is not zero, and the mutual inductance between the top sub-detection coil and the bottom sub-detection coil is not zero, so that mutual inductance coupling is generated between the top sub-detection coil and the bottom sub-detection coil.

In order to achieve the above objectives, an embodiment according to another aspect of the disclosure provides a metal object detection system, including: a detection coil array composed of a plurality of detection coils based on interlayer coupling, a digital frequency synthesizer or a signal generator, a processor, an impedance amplifying circuit, a plurality of analog-to-digital converters and a plurality of band-pass filters. The digital frequency synthesizer is connected to the detection coil array, each detection coil in the detection coil array is connected to one band-pass filter, each band-pass filter is connected to one analog-to-digital converter, and the processor is separately connected to the plurality of analog-to-digital converters, the detection coil array and the digital frequency synthesizer or the signal generator.

The arrangement mode of the metal object detection system according to the embodiment of the disclosure can synthesize the results of adjacent detection coils to significantly improve the detection effect in a case that a metal object is in a corner zone of a detection coil, thereby further eliminating non-detection blind zones. Furthermore, in application occasions of wireless power transmission, a detection coil group or a detection coil array can be laid on the surface of a transmitting terminal coil to detect metal objects, such that the safety of a wireless power transmission system is ensured, and the magnetic flux and induced voltage generated by the transmitting terminal coil during the power transmission of a wireless charging system can be significantly reduced, thereby increasing the signal-to-noise ratio of detection signals.

Further, in one embodiment of the disclosure, the branch of each detection coil in the detection coil array is connected to one switch tube or relay, one filter inductor and one filter capacitor.

Further, in one embodiment of the disclosure, two adjacent rows of detection coils in the detection coil array are arranged in a staggered manner.

Additional aspects and advantages of the disclosure will be set forth in part in the following description and, in part, will be apparent from the following description, or may be learned by practice of the disclosure.

BRIEF DESCRIPTION OF FIGURES

The above and/or additional aspects and advantages of the disclosure will become obvious and easy to understand from the description of the embodiments in conjunction with the following drawings, wherein FIG. 1A is a square detection coil composed of double rectangular sub-detection coils, FIG. 1B is a circular detection coil, FIG. 1C is a square detection coil composed of double triangular sub-detection coils, and FIG. 1D is a hexagonal detection coil.

FIG. 2A is a square detection coil composed of double rectangular sub-detection coils, FIG. 2B is a circular detection coil, FIG. 2C is a square detection coil composed of double triangular sub-detection coils, and FIG. 2D is a hexagonal detection coil.

FIG. 3A is a square detection coil composed of double rectangular sub-detection coils, FIG. 3B is a circular detection coil, FIG. 3C is a square detection coil composed of double triangular sub-detection coils, and FIG. 3D is a hexagonal detection coil.

FIG. 4A is a schematic diagram of top and bottom sub-detection coils without mutual inductance coupling when there is no metal object, and FIG. 4B is a schematic diagram of top and bottom sub-detection coils with mutual inductance coupling when there is a metal object.

LIST OF REFERENCE NUMERALS

Figure 1A:
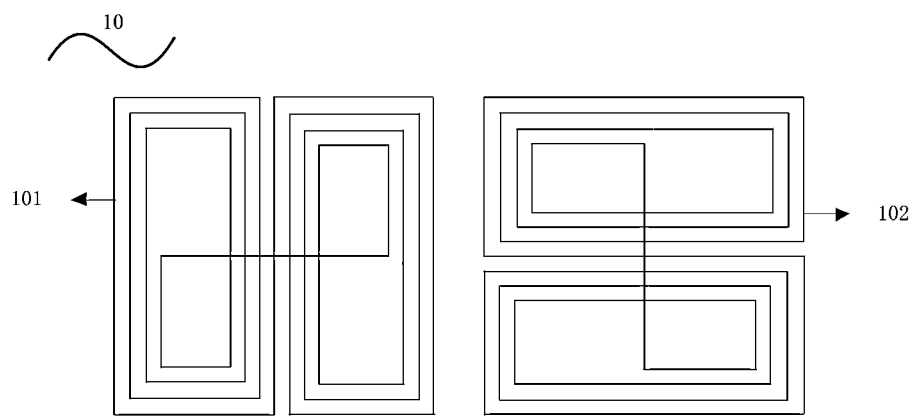
FIG. 1A-1D is a schematic structural diagram of a detection coil structure based on interlayer coupling according to one embodiment of the disclosure, where
Figure 1B:
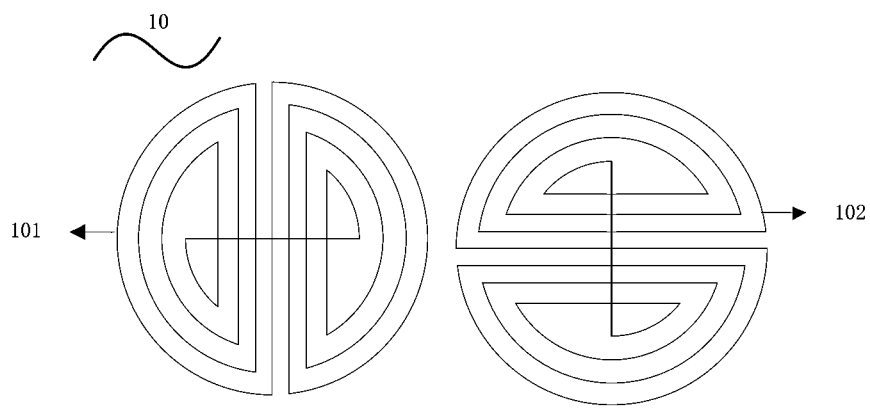
Figure 1C:
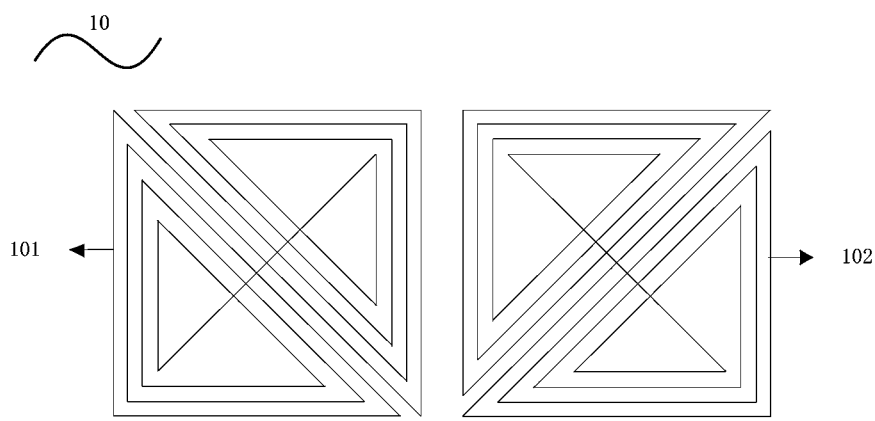
Figure 1D:
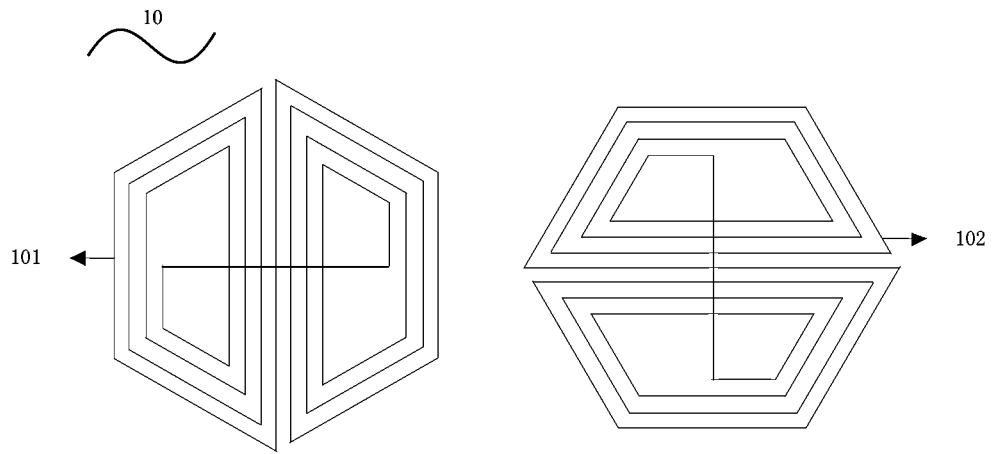

10 detection coil structure based on interlayer coupling, 101 top sub-detection coil, 102 bottom sub-detection coil, 103 lead wire or through hole or via hole, 104 switch or relay, 105 lead wire or through hole or via hole of coil circuit board for connecting top and bottom sub-detection coils, 106 switch or relay for switching connection mode of top and bottom sub-detection coils, 20 metal object detection system, 201 detection coil array, 202 digital frequency synthesizer or signal generator, 203 processor, 204 impedance amplifying circuit, 205 a plurality of analog-to-digital converters, 206 a plurality of band-pass filters, 207 signal generator.

DETAILED DESCRIPTION

Embodiments of the disclosure are described in detail below, and examples of the embodiments are illustrated in the accompanying drawings. The same or similar numbers from the beginning to the end denote the same or similar elements or the elements having the same or similar functions. The embodiments described below with reference to the drawings are illustrative and intended to be explanatory of the disclosure and are not to be construed as limiting the disclosure.

A detection coil structure based on interlayer coupling and a metal object detection system according to the embodiments of the disclosure are described below with reference to the accompanying drawings. First, the detection coil structure based on interlayer coupling according to the embodiments of the disclosure is described with reference to the accompanying drawings.

FIG. 1A-1D is a schematic structural diagram of a detection coil structure based on interlayer coupling according to one embodiment of the disclosure.

As shown in FIG. 1A-1D, the detection coil structure 10 based on interlayer coupling includes: a top sub-detection coil 101 and a bottom sub-detection coil 102.

The top sub-detection coil 101 and the bottom sub-detection coil 102 are the same in structure and similar or same in size, the top sub-detection coil 101 and the bottom sub-detection coil 102 are orthogonal to each other, the outer boundaries of the two detection coils are completely coincident, and the geometric symmetry centers of the two detection coils are also completely coincident.

Further, the structures of the top sub-detection coil 101 and the bottom sub-detection coil 102 are of any one of a square, a circle and a polygon.

In other words, as shown in FIG. 1A to FIG. 1D, the top sub-detection coil 101 and the bottom sub-detection coil 102 are similar or the same in structure and size, and may be of a square, a circle and polygons such as a regular hexagon and regular octagon; the outer boundaries of the top sub-detection coil 101 and the bottom sub-detection coil 102 are completely coincident, the structures of the top sub-detection coil 101 and the bottom sub-detection coil 102 (without considering lead wire required in actual arrangement) are both centrally symmetrical, and the symmetrical centers are completely coincident. The difference between position angles of the top sub-detection coil 101 and the bottom sub-detection coil 102 is 90° (that is, the top sub-detection coil and the bottom sub-detection coil are orthogonal).

Figure 6:
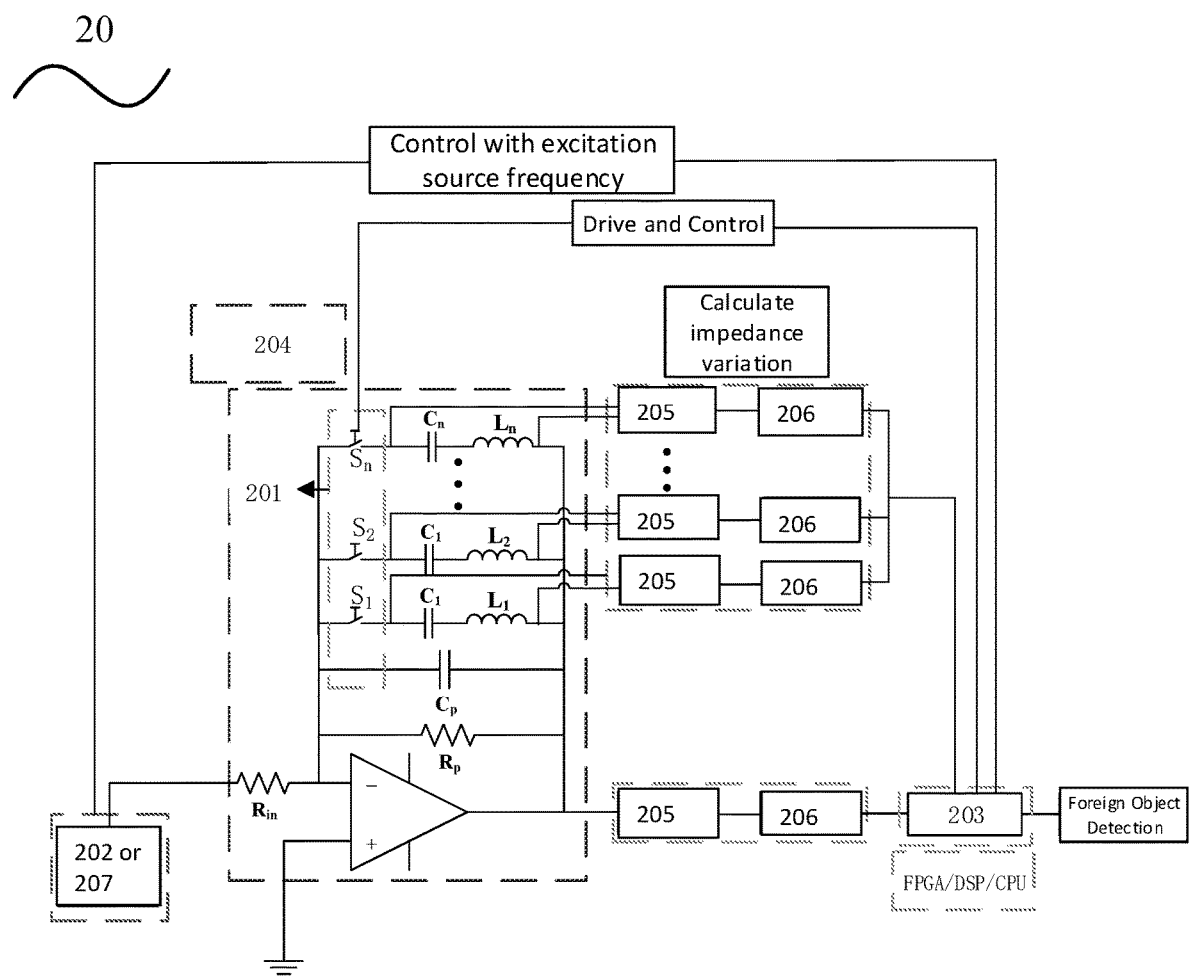
FIG. 6 is a schematic structural diagram of a metal object detection system according to one embodiment of the disclosure.

Further, the top sub-detection coil 101 includes a first terminal, a second terminal, a third terminal and a fourth terminal, and the bottom sub-detection coil 102 includes a fifth terminal, a sixth terminal, a seventh terminal and an eighth terminal. The first terminal is connected to the second terminal, the seventh terminal is connected to the eighth terminal, one of the two pairs of the first terminal and the second terminal as well as the seventh terminal and the eighth terminal can be connected to a lead wire 103 (as shown by dotted lines in FIG. 3A to FIG. 3D) and a switch or relay 104 so as to be connected to a detection circuit as shown in FIG. 6 to switch a plurality of detection coils in the detection circuit, and the other pair of terminals are connected. The third terminal and the fourth terminal are respectively connected to the fifth terminal and the sixth terminal, and can be connected to a lead wire 105 (as shown by dotted lines in FIG. 3A to FIG. 3D) and a switch or relay 106 for switching the connection mode of the top and bottom sub-detection coils. The connection mode of the third terminal and the fourth terminal or the fifth terminal and the sixth terminal can be switched to change the forward and reverse connection modes of the dotted terminals of the top and bottom sub-detection coils.

For example, if a forward connection mode of top and bottom sub-coils is set as: a terminal 3 of the top sub-detection coil 101 is connected to the bottom sub-detection coil 102 and through a terminal 5 by means of a switch or relay 106, and a terminal 4 of the top sub-detection coil 101 is connected to the bottom sub-detection coil 102 and through a terminal 6 by means of a switch or relay 106, the switch or relay 106 can be switched on partially to control that the terminal 3 of the top sub-detection coil 101 is connected to the bottom sub-detection coil 102 and through the terminal 6 by means of a switch or relay 106, and the terminal 4 of the top sub-detection coil 101 is connected to the bottom sub-detection coil 102 and through the terminal 5 by means of a switch or relay 106, thereby changing to a reverse connection mode of the top and bottom sub-coils.

Figure 2A:
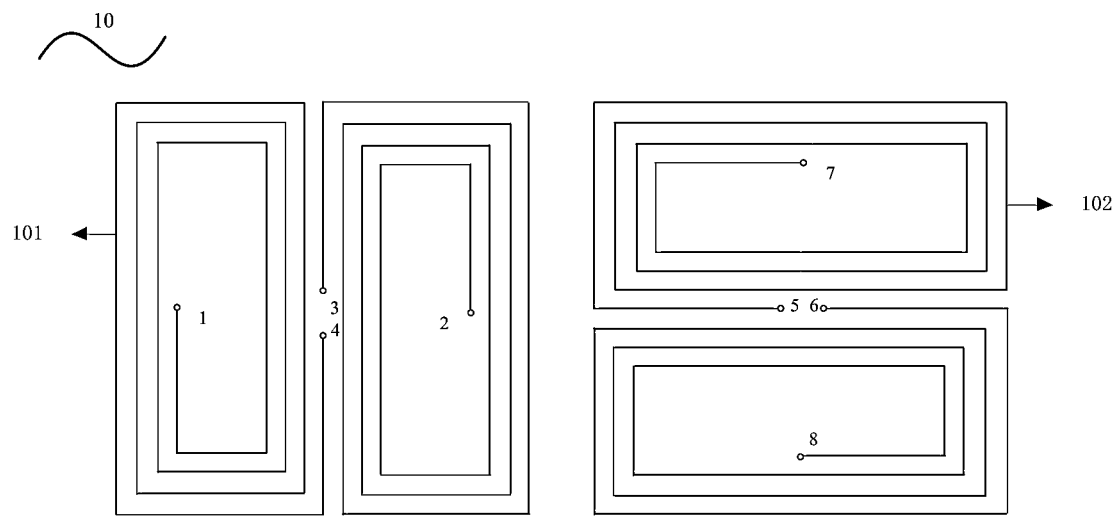
FIG. 2A-2D is an example diagram of terminals and connection of top and bottom sub-detection coils in a detection coil structure based on interlayer coupling according to one embodiment of the disclosure, where
Figure 3A:
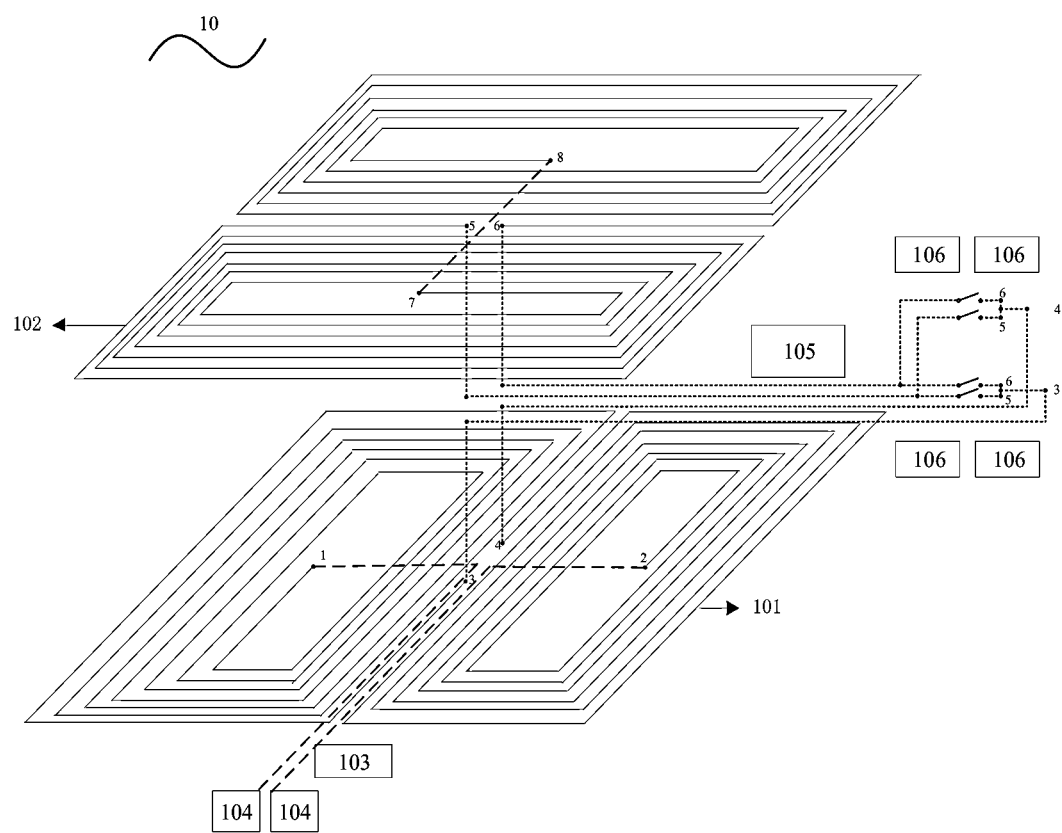
FIG. 3A-3D is a schematic structural diagram of changing the connection mode of top and bottom sub-coils by means of switches or relays by changing the connection mode of a third terminal and a fourth terminal as well as a fifth terminal and a sixth terminal in top and bottom sub-detection coils through a lead wire, through holes or via holes of a coil PCB in a detection coil structure based on interlayer coupling according to one embodiment of the disclosure, where

For example, as shown in FIG. 2A and FIG. 3A, in Embodiment 1, the structures of the top sub-detection coil 101 and the bottom sub-detection coil 102 are both square, connecting wires of the detection coils can be led out through a terminal 1 and a terminal 2 and used for switching and patrolling among a plurality of detection coils in a set of detection circuit, the top sub-detection coil 101 is connected to the bottom sub-detection coil 102 through the terminal 3, the terminal 4, the terminal 5, the terminal 6 and lead wires, through holes or via holes 105 in a coil PCB, the connection mode of the top sub-detection coil 101 and the bottom sub-detection coil 102 can be changed through the switch or relay 106, and a terminal 7 and a terminal 8 are in short connection.

Figure 2B:
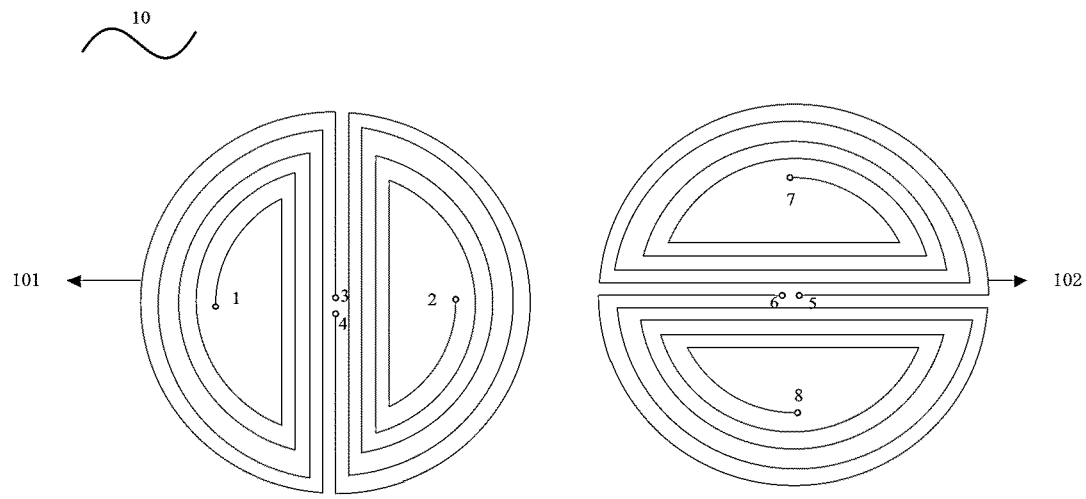
Figure 3B:
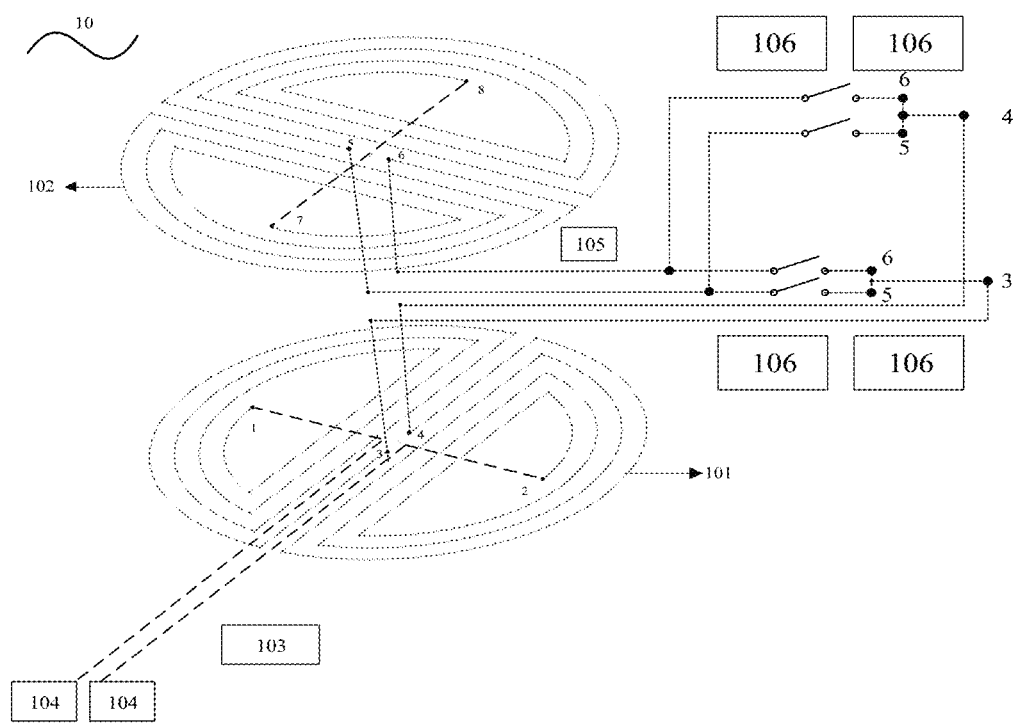

As shown in FIG. 2B and FIG. 3B, in Embodiment 2, the structures of the top sub-detection coil 101 and the bottom sub-detection coil 102 are both circular, connecting wires of the detection coils can be led out through a terminal 1 and a terminal 2 and used for switching and patrolling among a plurality of detection coils in a set of detection circuit, the top sub-detection coil 101 is connected to the bottom sub-detection coil 102 through the terminal 3, the terminal 4, the terminal 5, the terminal 6 and lead wires, through holes or via holes 105 in a coil PCB, the connection mode of the top sub-detection coil 101 and the bottom sub-detection coil 102 can be changed through the switch or relay 106, and a terminal 7 and a terminal 8 are in short connection.

Figure 2C:
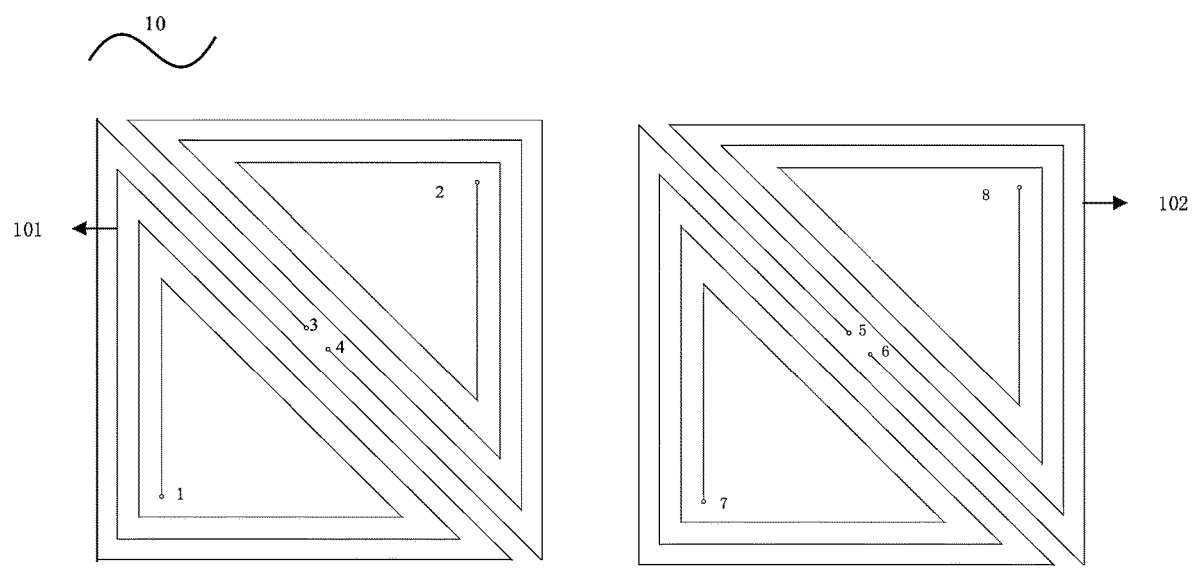
Figure 3C:
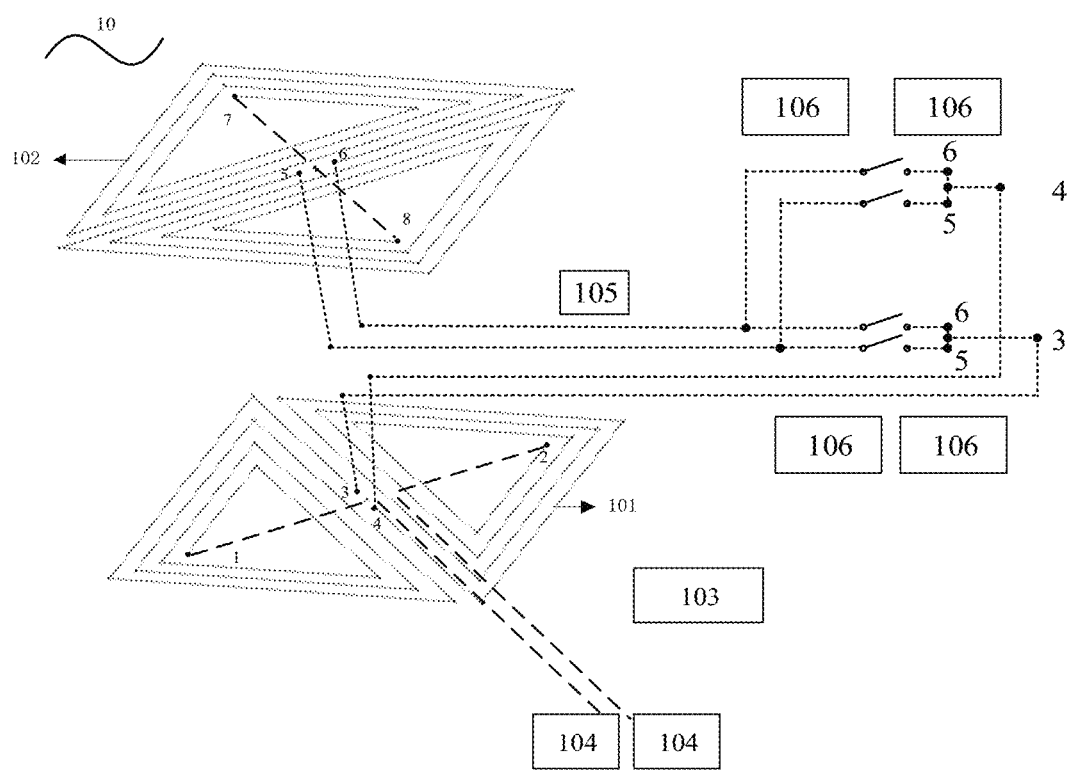

As shown in FIG. 2C and FIG. 3C, in Embodiment 3, connecting wires of the detection coils can be led out through a terminal 1 and a terminal 2 and used for switching and patrolling among a plurality of detection coils in a set of detection circuit, the top sub-detection coil 101 is connected to the bottom sub-detection coil 102 through the terminal 3, the terminal 4, the terminal 5, the terminal 6 and lead wires, through holes or via holes 105 in a coil PCB, the connection mode of the top sub-detection coil 101 and the bottom sub-detection coil 102 can be changed through the switch or relay 106, and a terminal 7 and a terminal 8 are in short connection.

Figure 2D:
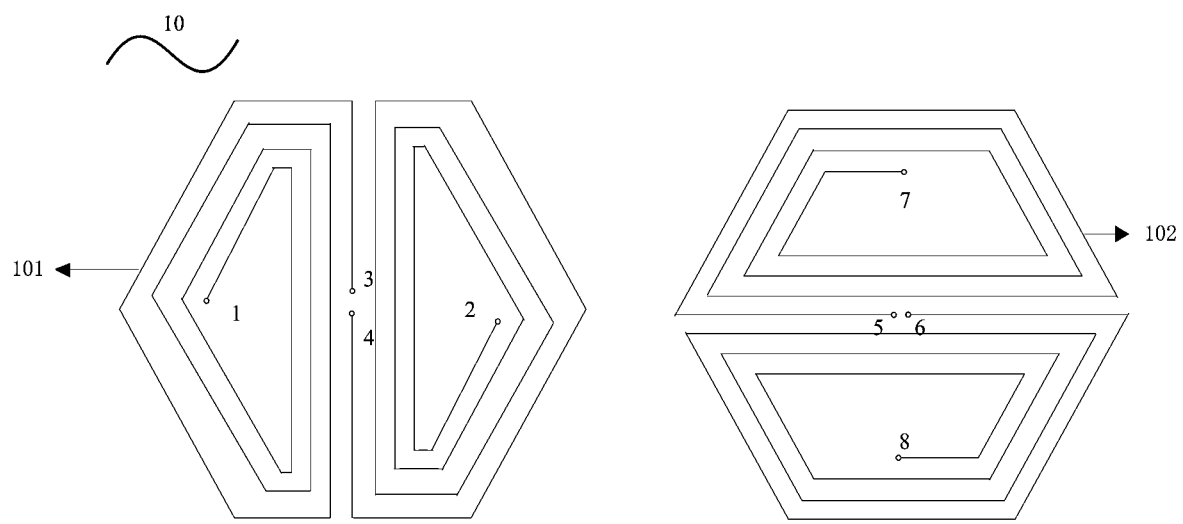
Figure 3D:
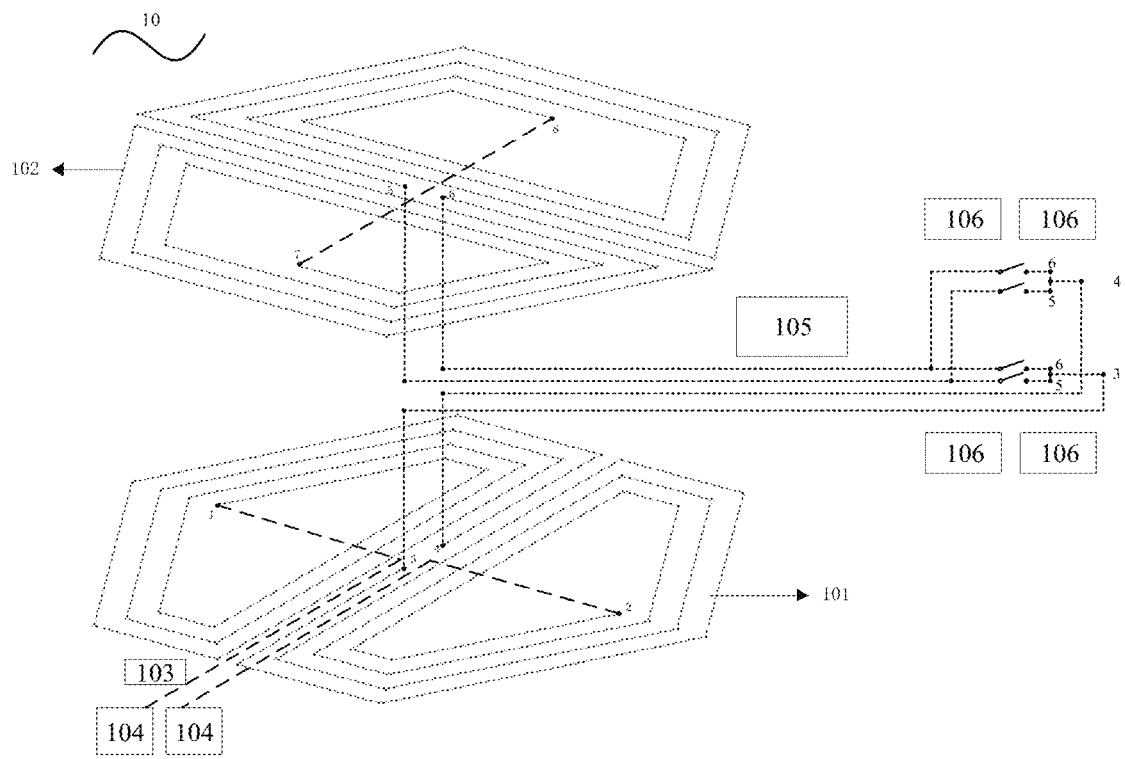

As shown in FIG. 2D and FIG. 3D, in Embodiment 4, connecting wires of the detection coils can be led out through a terminal 1 and a terminal 2 and used for switching and patrolling among a plurality of detection coils in a set of detection circuit, the top sub-detection coil 101 is connected to the bottom sub-detection coil 102 through the terminal 3, the terminal 4, the terminal 5, the terminal 6 and lead wires, through holes or via holes 105 in a coil PCB, the connection mode of the top sub-detection coil 101 and the bottom sub-detection coil 102 can be changed through the switch or relay 106, and a terminal 7 and a terminal 8 are in short connection.

Further, as shown in FIG. 3A to FIG. 3D, the third terminal and the fourth terminal in the top sub-detection coil and the fifth terminal and the sixth terminal in the bottom sub-detection coil are connected in series through a plurality of switch devices or relays 106 and lead wires, via holes or through holes 103 in a circuit board, and the connection mode of the top sub-detection coil 101 and the bottom sub-detection coil 102 can be switched through the switch devices or relays 106 to change the forward and reverse connection modes of the dotted terminals of the top and bottom sub-detection coils, so that the positive or negative feature of mutual inductance between the top sub-detection coil 101 and the bottom sub-detection coil 102 is changed. When the connection modes of the top sub-detection coil 101 and the bottom sub-detection coil 102 are different, if there is a metal object, different connection modes will cause the current positive or negative feature of mutual inductance between the top sub-detection coil 101 and the bottom sub-detection coil 102 to be different.

The switching mode can be realized by switch devices such as analog switches, switch tubes and relays.

Figure 4A:
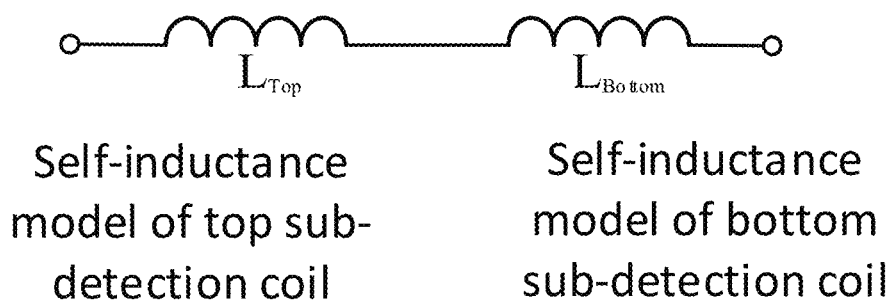
FIG. 4A-4B is an equivalent mutual inductance model diagram of top and bottom sub-detection coils in a detection coil structure based on interlayer coupling according to one embodiment of the disclosure, where
Figure 4B:
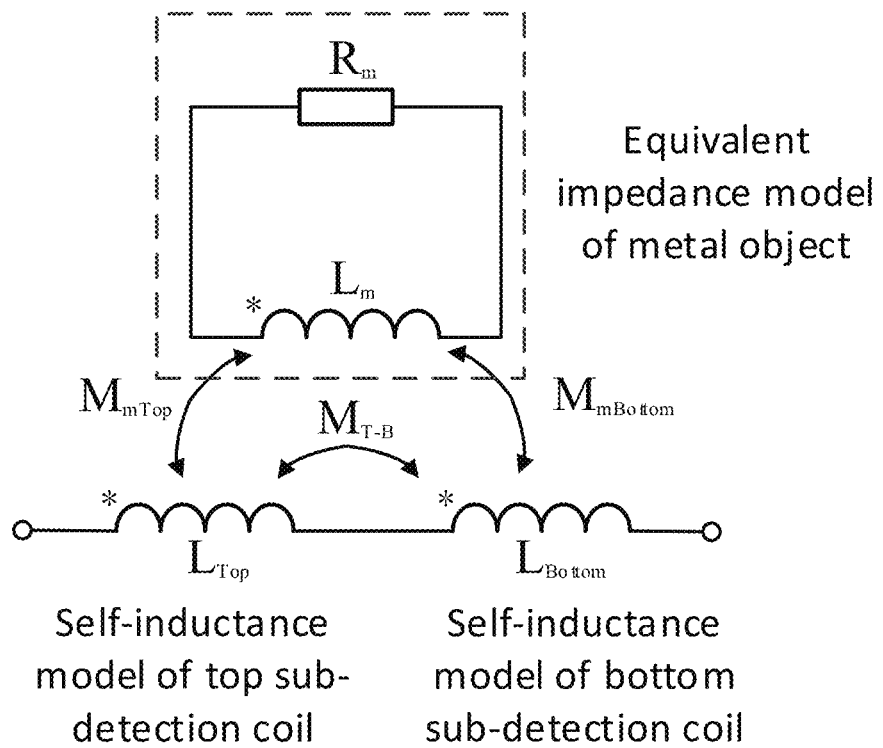

Specifically, as shown in FIG. 4A-4B, the forward series connection and reverse series connection of the top sub-detection coil 101 and the bottom sub-detection coil 102 can be realized by changing the connection mode of the top sub-detection coil 101 and the bottom sub-detection coil 102.

When there is no metal object near the detection coil, the net magnetic flux generated by the bottom sub-detection coil 102 on the top sub-detection coil 101 is zero, the net magnetic flux generated by the top sub-detection coil 101 on the bottom sub-detection coil 102 is zero, and ideally, the mutual inductance between the top sub-detection coil 101 and the bottom sub-detection coil 102 is zero, so that no mutual inductance coupling is generated between the top sub-detection coil 101 and the bottom sub-detection coil 102. When there is a metal object near the detection coil, the net magnetic flux generated by the bottom sub-detection coil 102 on the top sub-detection coil 101 is not zero, the net magnetic flux generated by the top sub-detection coil 101 on the bottom sub-detection coil 102 is not zero, and the mutual inductance between the top sub-detection coil 101 and the bottom sub-detection coil 102 is not zero, so that mutual inductance coupling is generated between the top sub-detection coil 101 and the bottom sub-detection coil 102.

Figure 5:
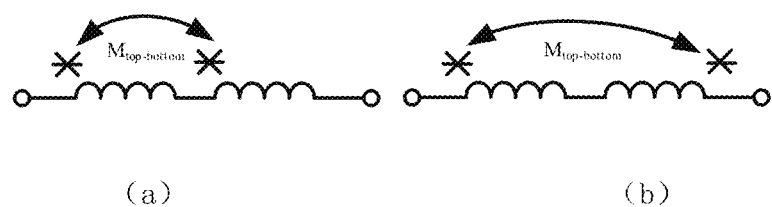
FIG. 5 is a schematic diagram showing changes in the connection mode of dotted terminals of each sub-coil before and after the switching of the connection mode of top and bottom sub-coils according to one embodiment of the disclosure.

Further, as shown in FIG. 5, the series connection mode of the top and bottom sub-detection coils, such as forward series connection of the dotted terminals and reverse series connection of the dotted terminals, can be changed through switching, and finally, the positive or negative feature of mutual inductance between the top sub-detection coil 101 and the bottom sub-detection coil 102 is consistent with the positive or negative feature of change in self-inductance of the metal object detection coil in the presence of a metal object, thereby amplifying the impedance variation of the metal object to the detection coil. In addition, orthogonal arrangement can improve the detection effect in a case that the metal object is in a corner zone of the detection coil to further eliminate non-detection blind zones, thereby realizing accurate detection of small-size metal objects such as coins and clips.

In Embodiment 5, the detection coil structure provided in the embodiments of the disclosure can be applied to the field of wireless power transmission. A detection coil group or a detection coil array consisting of the top sub-detection coil 101 and the bottom sub-detection coil 102 can be laid on the surface of a transmitting terminal coil to detect metal objects. When there is a metal object near the transmitting terminal coil, the mutual inductance coupling between the top sub-detection coil 101 and the bottom sub-detection coil 102 is not 0, and the interlayer mutual inductance between the top and bottom sub-detection coils is used to amplify the impedance variation of the metal object to the detection coil, thereby significantly improving the detection sensitivity and accuracy. The entire detection coils of the structure have a lower degree of coupling with transmitting terminal and receiving terminal coils of a wireless power transmission system, which reduces the magnetic flux and induced voltage generated by the transmitting terminal coil during the power transmission of a wireless charging system, thereby increasing the signal-to-noise ratio of detection signals. When a metal object is detected on the surface of the transmitting terminal, an alarm is given or even the wireless charging process is cut off, thereby ensuring the safety of the wireless charging process. In addition, the orthogonal arrangement structure of the top sub-detection coil 101 and the bottom sub-detection coil 102 can improve the detection effect in a case that the metal object is in a corner zone of the detection coil by means of the interlayer mutual inductance coupling effect.

In conclusion, the detection coil structure based on interlayer coupling, provided in the embodiments of the disclosure, can significantly amplify the impedance variation of the metal object to the entire detection coil by means of the mutual inductance coupling between the top and bottom sub-detection coils, thereby realizing comprehensive accurate detection of small-size metal objects such as coins and clips. At the same time, the staggered arrangement mode can effectively avoid the blind zone when the metal object is located at the corner of the detection coil, and can significantly improve the object detection accuracy. Furthermore, in application occasions of wireless power transmission, the detection coil group or the detection coil array can be laid on the surface of the transmitting terminal coil to detect metal objects, such that the safety of the wireless power transmission system is ensured, and the magnetic flux and induced voltage generated by the transmitting terminal coil during the power transmission of the wireless charging system can be significantly reduced, thereby increasing the signal-to-noise ratio of detection signals.

Secondly, the metal object detection system provided according to the embodiments of the disclosure is described with reference to the accompanying drawings.

FIG. 6 is a schematic structural diagram of a metal object detection system according to one embodiment of the disclosure.

As shown in FIG. 6, the system 20 includes: a detection coil array $L_k$ (k=1, 2, . . . , n) 201 composed of a plurality of the above detection coils based on interlayer coupling, a digital frequency synthesizer 202 or a signal generator 207, a processor 203, an impedance amplifying circuit 204, a plurality of analog-to-digital converters 205 and a plurality of band-pass filters 206.

The digital frequency synthesizer 202 is connected to the detection coil array 201, each detection coil in the detection coil array 201 is connected to one band-pass filter 206, each band-pass filter 206 is connected to one analog-to-digital converter 205, and the processor 203 is separately connected to the plurality of analog-to-digital converters 205, the detection coil array 201 and the digital frequency synthesizer 202.

Figure 7:
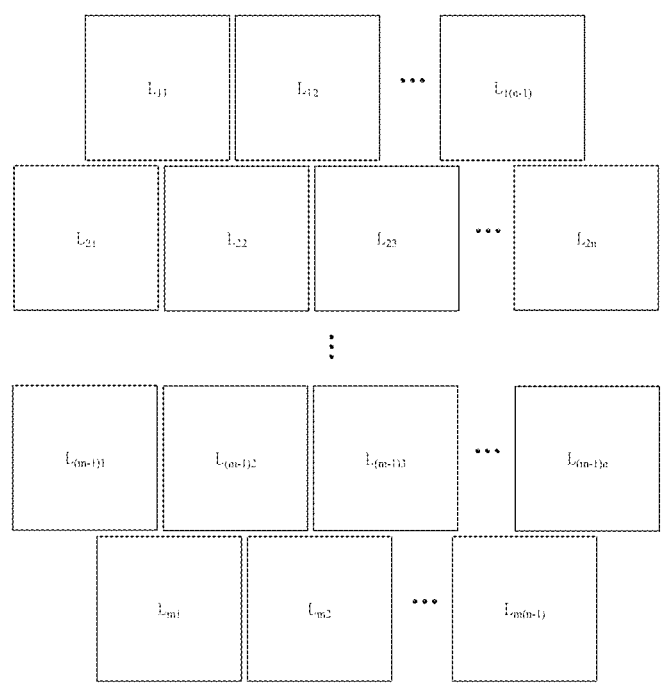
FIG. 7 is a schematic diagram of overall arrangement of a detection coil array according to one embodiment of the disclosure.

The branch of each detection coil in the detection coil array 201 is connected to one switch tube or relay, one filter inductor $L_n$ and one filter capacitor $C_n$, as shown in FIG. 7, and two adjacent rows of detection coils in the detection coil array 201 are arranged in a staggered manner.

Specifically, as shown in FIG. 6, assuming that there are a total of m rows of detection coil arrays and two adjacent rows of detection coils are arranged in a staggered manner, the digital frequency synthesizer 202 or the signal generator 207 outputs a high-frequency excitation source signal into the impedance amplifying circuit 204. When the processor 203 drives and controls the detection coil array 201 to detect metal objects, if a certain detection coil detects a metal object, the band-pass filter 206 performs signal processing to obtain the amplitude value or effective value of a voltage signal with a better signal-to-noise ratio for detection, the voltage amplitude value or effective value signal of the detection signal is converted into a digital signal through the corresponding analog-to-digital converter 205 and sent to the processor 203, and the processor 203 calculates the impedance variation according to the digital signal and controls the digital frequency synthesizer 202 with the excitation source frequency according to the impedance variation to amplify the impedance. At the same time, the position of the detected metal object is determined according to the position of the detection coil. In addition, due to the staggered arrangement between two adjacent rows of detection coils, the blind zone caused when a metal object is located at the corner of a detection coil can be effectively reduced.

It can be understood that due to the small interference of the power magnetic field generated by the detection coil array, the anti-interference ability is strong, and the metal object detection system can work independently. In addition, the magnetic lines of the detection coil structure are closed, and the cross-coupling between the detection coils in the detection coil array has less influence, so that the parameter consistency of the detection coil array is better.

In conclusion, the metal object detection system provided in the embodiments of the disclosure can significantly amplify the impedance variation of the metal object to the entire detection coil by means of the mutual inductance coupling between the top and bottom sub-detection coils, thereby realizing comprehensive accurate detection of small-size metal objects such as coins and clips. At the same time, the staggered arrangement mode can effectively avoid the blind zone when the metal object is located at the corner of the detection coil, and can significantly improve the object detection accuracy.

In addition, terms "first" and "second" are only intended for description, but cannot be construed as indicating or implying relative importance or implicitly indicating the number of the specified technical features. Thus, the features defined with "first" and "second" may explicitly or implicitly include at least one of the features. In the description of the disclosure, the meaning of "a plurality of" is at least two, such as two and three, unless otherwise specifically defined.

In the description of the present description, descriptions with reference to terms "one embodiment", "some embodiments", "example", "specific example", or "some examples" and the like mean that specific features, structures, materials, or characteristics described in combination with the embodiments or examples are included in at least one embodiment or example of the disclosure. In the present description, the schematic representations of the foregoing terms are not necessarily directed to the same embodiment or example. Furthermore, the particular features, structures, materials, or characteristics described are combined in a suitable manner in any one or more embodiments or examples. Moreover, those skilled in the art connect and combine different embodiments or examples described in the present description and features of different embodiments or examples without mutual conflict.

Although the embodiments of the disclosure have been shown and described above, it can be understood that the foregoing embodiments are illustrative and are not intended to be understood as limiting the disclosure. A person of ordinary skill in the art make changes, modifications, replacements and variations without departing from the scope of the disclosure.

What is claimed is:

1. An apparatus, comprising a top sub-detection coil, a bottom sub-detection coil, and a switch;
   wherein the top sub-detection coil and the bottom sub-detection coil are structurally the same;
   wherein the top sub-detection coil and the bottom sub-detection coil are parallel to a plane;
   wherein the top sub-detection coil and the bottom sub-detection coil are orthogonal to each other;
   wherein orthographic projection of a convex hull of the top sub-detection coil onto the plane and orthographic projection of a convex hull of the bottom sub-detection coil onto the plane are the same; and
   wherein orthographic projection of a geometric symmetry center of the top sub-detection coil onto the plane and orthographic projection of a geometric symmetry center of the bottom sub-detection coil onto the plane are the same;
   wherein the top sub-detection coil comprises a first terminal, a second terminal, a third terminal and a fourth terminal, and the bottom sub-detection coil comprises a fifth terminal, a sixth terminal, a seventh terminal and an eighth terminal;
   wherein the first terminal and the third terminal are terminals of a same inductor, the second terminal and the fourth terminal are terminals of a same inductor, the fifth terminal and the seventh terminal are terminals of a same inductor, the sixth terminal and the eighth terminal are terminals of a same inductor;
   wherein the first terminal and the second terminal are configured to connect to a detection circuit;
   wherein the seventh terminal is short-circuited to the eighth terminal;
   wherein the switch is configured to switch between a first configuration where the third terminal is connected to the fifth terminal and the fourth terminal is connected to the sixth terminal and a second configuration where the third terminal is connected to the sixth terminal and the fourth terminal is connected to the fifth terminal.

2. The apparatus according to claim 1, wherein the convex hulls of the top sub-detection coil and of the bottom sub-detection coil are a circle or a polygon.

3. A metal object detection system, comprising an array of the apparatuses of claim 1, signal generator, a processor, analog-to-digital converters and band-pass filters;
   wherein the signal generator is connected to the array;
   wherein each of the apparatuses of the array is connected to one of the band-pass filters;
   wherein each of the band-pass filters is connected to one of the analog-to-digital converters; and
   wherein the processor is connected to the band-pass filters.

4. The metal object detection system according to claim 3, wherein the first terminal and the second terminal in each of the apparatuses of the array are respectively connected to a capacitor and one of the analog-to-digital converters.

5. The metal object detection system according to claim 3, wherein the apparatuses of the array are arranged in staggered rows.

6. The metal object detection system according to claim 3, wherein the signal generator is a digital frequency synthesizer.

7. The apparatus of claim 1, wherein the top sub-detection coil comprises two partial coils rotationally symmetric around the geometric symmetry center of the top sub-detection coil; or wherein the bottom sub-detection coil comprises two partial coils rotationally symmetric around the geometric symmetry center of the bottom sub-detection coil.

* * * * *